Dec. 20, 1966    E. R. COCCO ETAL    3,293,106
CONNECTION FOR ATTACHING METAL FOIL TO PLASTIC SUBSTRATE
Filed Sept. 8, 1964

INVENTORS
E. R. COCCO
E. C. HARDESTY

BY *JM Presson*

ATTORNEY

United States Patent Office 3,293,106
Patented Dec. 20, 1966

3,293,106
CONNECTION FOR ATTACHING METAL
FOIL TO PLASTIC SUBSTRATE
Eugene R. Cocco, Baltimore, and Edwin C. Hardesty,
Perry Hall, Md.; said Cocco assignor to Bell Telephone
Laboratories, Incorporated, New York, N.Y., a corporation of New York, and said Hardesty assignor to
Western Electric Company, Incorporated, New York,
N.Y., a corporation of New York
Filed Sept. 8, 1964, Ser. No. 394,812
8 Claims. (Cl. 161—112)

This invention relates generally to an adhesive connection for securing together two dissimilar materials in face-to-face relationship, and more specifically this invention relates to a connection for securing a metal foil in face-to-face relationship with a plastic substrate by an adhesive connection, the adhesive having a relatively high bonding strength with the substrate but a relatively low bonding strength with the foil.

There presently exists a need in several diverse arts for a connection composed of hardened adhesive that will satisfactorily secure two layers of material together in face-to-face relationship, each layer of material having a different capability of bonding to the adhesive and one layer having a thickness on the order of thousandths of an inch. For instance in the printed circuit art, it is typically requisite that an electrically conductive foil be applied in face-to-face relationship with an insulating supporting base or substrate, the foil being composed of metal, such as copper or stainless steel, which has an inherently poor bonding capability with currently available adhesives as compared to the bonding capability of the base or substrate which is typically composed of a thermosetting plastic.

Also, known adhesive compositions, particularly thermosetting-type adhesives, currently regarded as being suitable for bonding a metal strip or foil to a plastic base, have a relatively high tensile strength but a comparatively low strength to shear or combined tension and shear stresses. Therefore, it is possible that an adhesive connection between two dissimilar materials may fail should one of the strips receive relatively low-magnitude shearing forces or a combination of relatively low-magnitude tension and shear forces. Obviously, if bonding is possible between the strips, it would be advantageous to utilize the high tensile strength characteristics of the adhesive rather than the lower shear strength in the construction of the connection. Conventional rivets, both plastic and metal, have been, and are used, in endeavors to surmount the problem of low-magnitude shearing. However, resort to this recourse is oftentimes unfeasible because such rivets will not effectively resist combined forces of tension and shear particularly if one strip, for example, the metal foil, is very thin and if heads of the rivets must be machined off flush with the outer surfaces of the strips they attach so as not to project above these surfaces.

Broadly, therefore, it is an object of this invention to provide a connection for securing two layers of dissimilar material in face-to-face relationship.

More specifically, it is an object of this invention to provide an adhesive connection for securing a metal foil or thin metal material to a plastic substrate in face-to-face relationship.

According to one embodiment of this invention, a connection is provided between a thin layer of material, foil and the like, and a supporting substrate, the connection being formed of an adhesive in a prescribed connective relationship with elements projecting from the material or foil. The resulting connection effectively counteracts combined forces of shear and tension tending to tear the foil from the substrate.

Other objects and advantages will be apparent from the following detailed description when considered in conjunction with the accompanying drawing, wherein.

Figure 1:
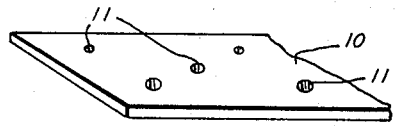
FIG. 1 is a perspective view of a preformed metal foil and the like for connection to a base or substrate in accordance with the principles of this invention.

Referring now to FIG. 1 of the drawing for a more complete understanding of this invention, there is shown a metal foil or thin metal strip 10 having a predetermined pattern of holes 11 formed therein, the holes being punched, stamped or otherwise produced by methods familiar to those working in the art, the foil 10 being composed of any metal or of combinations of metals, as for example, copper, bronze or stainless steel.

Figure 2:
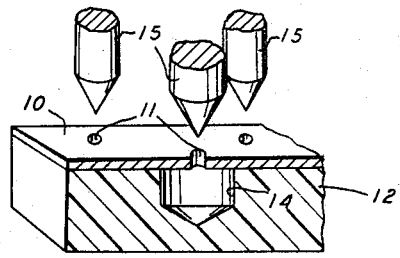
FIG. 2 is a sectioned isometric illustrating mechanism for forming a pattern of frusto-conical protuberances on the foil.
Figure 3:
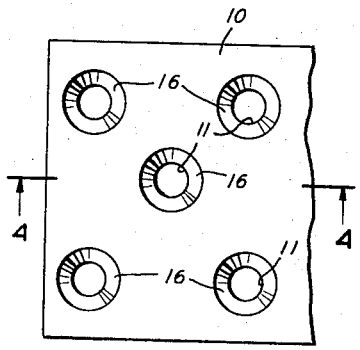
FIG. 3 is a top plan view of a metal foil after having been formed by the mechanism illustrated in FIG. 2.

The foil 10 with the preformed holes 11 therein may be placed upon a die plate 12, as shown in FIG. 2, incorporating conical forming holes 14, the pattern of the forming holes 14 coinciding with the pattern of holes 11. Conically tapered reciprocatively moving punches 15 are driven perpendicularly to the horizontal plane of the foil 10 and cooperate with the forming holes 14 to form symmetrical frusto-conical protuberances 16, as best shown in FIG. 3 of the drawings, the surfaces of the protuberances 16 tapering at an angle $\theta$ with respect to a vertical centerline C—C taken through the holes 14. The frusto-conical protuberances 16 project outwardly from the horizontal plane of the foil 10, the circular line of departure defined between the plane of the foil 10 and the outer surfaces forming each protuberance 16 being referred to by numeral 18.

The production of frusto-conical projections of desired shape may also be effected by passing the foil 10 against a rotating device having a pattern of peripheral protuberance-forming spikes extending therefrom, the spikes being designed to punch the desired pattern of protuberances or projections from the foil. Obviously, other methods for accomplishing this purpose will be evident to those skilled in the art.

Figure 4:
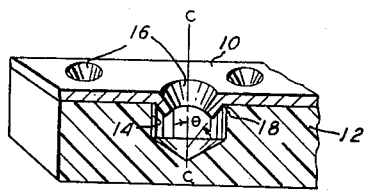
FIG. 4 is a sectioned isometric showing a typical frusto-conical protuberance utilized in accordance with the principles of this invention.

Referring now to FIG. 4 of the drawing, there is shown a base or substrate 20 which is preferably composed, at least partially, of a thermosetting plastic such as a phenol fiberboard, or of other thermosetting plastic capable of providing electrical insulation and support to the foil 10. The base 20 is formed with a flat surface 21 into which a pattern of cylindrical cavities 22 may be formed by drilling or molding operations or by other techniques. The vertical axis of each cavity 22 coaligns with the axis of symmetry C—C of each protuberance 16 and the diameter of the cavities 21 being substantially equal to the diameter defined by the line of departure 18. With the foil 10 properly positioned in face-to-face relationship with the surface 21 of the base 20, the frusto-conical protuberances 16 project concentrically into the cavities 22.

Figure 5:
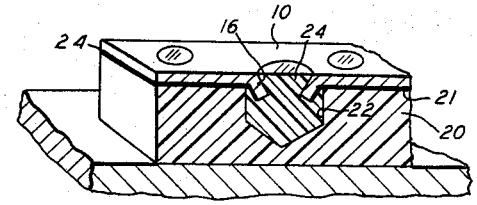
FIG. 5 is a sectioned isometric illustrating the somewhat rivet-like connection formed between the foil and the base in accordance with the principles of the instant invention.

Prior to the orienting and placement of the foil 10 upon the base 20, the base 20 may have applied thereto a coating of a liquid adhesive 24, liquid epoxide adhesives being preferable with a base 20 composed of a thermosetting plastic. A sufficient quantity of adhesive may be applied to the surface 21 so that the cavities 22 are also filled with the adhesive. The metal foil 10 is then oriented with the protuberances 16 positioned concentrically in the cavities 22, as described hereinabove, and the foil pressed against the surface 21 of the base 20 by, for instance, passing both foil and base between a pair of coacting rollers. The protuberances 16 displace the adhesive 24 previously filled in the cavities 22 so that adhesive 24 rises through the circular rims formed by the holes 11 to a level substantially flush with the outermost surface of the foil 10, as shown in FIG. 5. The connective assemblage may be heated to accelerate the solidification of the adhesive 24 until all surfaces of the protuberances 16 are solidly embedded in adhesive.

A preferred embodiment of this invention contemplates a metal foil 10, the base 20 composed of a thermosetting plastic and an adhesive 24 composed of an epoxy compound that bonds to the thermosetting plastic at the base 20. If the foil 10 is composed of a metal such as stainless steel, there will be little or possibly no bonding between the epoxy adhesive 24 and the protuberances 16, all bonding being effected between the adhesive and the base 20. Thus in these instances, the mechanical securing features available in the connection shown in FIG. 5 must be primarily relied upon as the mechanism for attaching the foil 10 to the base 20.

An analysis of the forces that are typically received by the rivet-like connection will establish that forces of shear are typically received in directions substantially parallel to the plane of the interface between the foil 10 and the base 20, and forces of tension are typically applied to the connection in a direction substantially perpendicular to the plane of the interface. The combination of tensile and shearing forces provide resultant force vectors at acute angles to the plane of the surface 21 considered with respect to the axis of symmetry C—C. The angle $\theta$ formed by the protuberances 16 as shown in FIG. 4 is preferably substantially equal to the angle the resultant forces typically make with the axis C—C thereby providing optimum opposition to combined forces of tension and shear.

For most applications, an angle $\theta$ of 45° may be considered optimum; but in any event, the angle $\theta$ should be small enough to permit complete coating of the protuberances 16 by adhesive 24. In the event the foil 10 is composed of a material such that bonding is possible between the protuberances 16 and the adhesive 24, a maximum surface area is available for bonding the foil to the substrate.

If desired, the adhesive 24 need not be applied between adjacent planar surfaces of the foil 10 and the base 20, the integrity of the connection governed solely by the rivet-like connection formed in the cavities 22.

Figure 6:
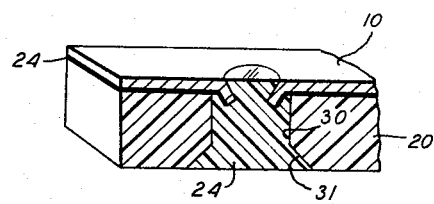
FIG. 6 is a sectioned isometric illustrating another embodiment of this invention.

FIG. 6 illustrates another embodiment constructed in accordance with the principles of this invention. In this embodiment, the base 20 is provided with a cavity 30 which extends completely through the base 20. The surface 31 surrounding the end of the cavity 30 opposite the surface 21 is countersunk to provide a surface against which the solidified adhesive 24 can bear to further resist withdrawal thereof from the cavity.

It is to be understood that the above-described arrangement is merely illustrative of the application of the principles of the invention. Numerous other arrangements may be readily devised by those skilled in the art which will embody the principles of the invention and fall within the spirit and scope thereof.

What is claimed is:

1. A connection for securing together materials having dissimilar bonding capabilities, comprising:
    a support base composed of one material having at least one recess formed in one surface thereof,
    a second flat material having one surface positioned in face-to-face relationship with said one surface of said base and including a second outer surface,
    at least one protuberance formed from the second material and extending into the recess at an angle to the horizontal plane of said second material, the innermost end of said protuberance in the recess being apertured, and
    an adhesive in each cavity adhesively bonded to said base, the adhesive extending from the recess through the aperture to cover all exterior surfaces of said protuberance substantially flush to said outer surface of said second material.

2. A connection for securing together materials having dissimilar bonding capabilities, comprising:
    a flat supporting substrate at least partially composed of a plastic material, said substrate having a predetermined pattern of cylindrical cavities formed in one surface thereof,
    a metallic foil having respective inner and outer planar surfaces, the inner surface positioned in face-to-face relationship with said one surface of said substrate,
    a pattern of substantially frusto-conical protuberances extending from said inner surface of said foil, each cavity in said substrate symmetrically receiving a protuberance with the axis of symmetry of each protuberance substantially coaligned with the axis of each cavity, the ends of said protuberances furthermost in the cavities having an opening therein for permitting the flow of adhesive material therethrough, and
    a plastic adhesive filling each cavity flush to the outer planar surface of said foil and encapsulating the opposite surfaces of each protuerance, the plastic adhesive having a relatively high strength bonding capability with said substrate.

3. A connective device, comprising:
    a supporting base including at least one flat surface, said base at least partially composed of a thermosetting plastic, said base including a predetermined pattern of substantially cylindrical cavities in said surface, the cavities extending substantially vertically from the plane of said surface,
    a metal foil having a pattern of projections coinciding with said predetermined pattern of cavities and positioned in face-to-face relationship with said surface so that a projection extends into each cavity, each projection having an axis of symmetry and being substantially symmetrical with respect thereto, each projection forming an acute angle of substantially less than 90° with respect to said axis of symmetry and the plane of said foil, the ends of projections in the cavities forming circular openings so that all surfaces forming each projection communicate with an associated cavity, and
    a thermosetting adhesive filling each cavity and encapsulating all surfaces of each projection, said adhesive bonding to said base and at least mechanically securing said foil thereto.

4. A connective device as claimed in claim 3, wherein:
    a layer of said adhesive is provided ketween adjacent surfaces of said foil and said base.

5. A connection for securing together materials having dissimilar bonding capabilities, comprising:
    a substrate composed at least in part of a thermosetting plastic having a relatively high bonding capability with a thermosetting plastic adhesive and provided with a flat supporting surface, said substrate including a pattern of cylindrical cavities extending into said surface, the axis of the cavities being substantially perpendicular to the plane of said surface,
    a metallic foil including inner and outer planar surfaces, a pattern of frusto-conical elements formed from said foil and projecting from the inner surface thereof, said elements coinciding with, and received by cavities in said substrate such that the truncated end of each projection extends furthermost into a cavity,
    a rim formed by said truncated end of each frusto-conical element and defining an aperture interconnecting the cavities with the outer surface of said foil, and a thermosetting adhesive bonded to the walls of said cavities and extending substantially flush to said outer surface of said foil and encapsulating said elements so as to secure said foil to said substrate.

6. A connection for securing together materials having dissimilar bonding capabilities, comprising:

a substrate composed at least in part of a thermosetting plastic having a relatively high bonding capability with a thermosetting plastic adhesive and provided with a flat supporting surface, said substrate including a pattern of cylindrical cavities extending into said surface, the axis of the cavities being substantially perpendicular to the plane of said surface, a metallic foil including inner and outer planar surfaces, a pattern of frusto-conical elements formed from said foil and projecting from the inner surface thereof, said elements coinciding with, and received by cavities in said substrate such that the truncated end of each projection extends furthermost into a cavity, a rim formed by said truncated end of each frusto-conical element and defining an aperture interconnecting the cavities with the outer surface of said foil, and an epoxide adhesive film for bonding said foil to said substrate covering said inner surface of said foil and said supporting surface of said substrate, said adhesive additionally filling each cavity flush to said outer surface of said foil so that said elements are embedded therein.

7. A connection for securing together materials having dissimilar bonding capabilities, comprising:

a support base composed of one material having at least one cavity formed in one surface thereof, the cavity extending through said one material, a second flat material having one surface positioned in face-to-face relationship with said one surface of said base and including a second outer surface, at least one protuberance formed from the second material and extending into the cavity at an angle to the horizontal plane of said second material, the innermost end of said protuberance in the cavity being apertured, an adhesive in each cavity adhesively bonded to said base, the adhesive extending from the cavity through the aperture to cover all exterior surfaces of said protuberance substantially flush to said outer surface of said second material, and a countersunk rim formed by the cavity in the surface of said base opposite said one surface and providing an inclined surface to the plane of said one surface against which said adhesive bears to resist withdrawal thereof from the cavity.

8. A connection for securing together materials having dissimilar bonding capabilities, comprising:

a substrate composed at least in part of a thermosetting plastic having a relatively high bonding capability with a thermosetting plastic adhesive and provided with a flat supporting surface, said substrate including a pattern of cylindrical cavities extending perpendicularly through said surface, a metallic foil including inner and outer planar surfaces, a pattern of frusto-conical elements formed from said foil and projecting from the inner surface thereof, said elements coinciding with, and received by cavities in said substrate such that the truncated end of each projection extends furthermost into a cavity, said truncated end of each frusto-conical element defining an aperture for interconnecting the cavities with the outer surface of said foil, an epoxide adhesive film for bonding said foil to said substrate coverinng said inner surface of said foil and said supporting surface of said substrate, said adhesive additionally filling each cavity flush to said outer surface of said foil so that said elements are embedded therein, and a countersunk rim formed concentric with each cavity in the surface of said substrate opposite said supporting surface, said rim providing a surface inclined to the axis of the cavity against which said adhesive bears to resist withdrawal thereof from the cavity.

References Cited by the Examiner
UNITED STATES PATENTS

| 2,569,065 | 9/1951 | Lavin | 264—263 |
| 2,912,746 | 11/1959 | Oshry et al. | 29—155.5 |
| 3,246,386 | 4/1966 | Ende | 29—155.5 |

EARL M. BERGERT, *Primary Examiner.*

D. J. DRUMMOND, *Assistant Examiner.*